March 10, 1925.

A. R. SCHOLIN

TREATMENT OF LABELS

Filed Oct. 28, 1921

Inventor
Axel R. Scholin
By, Nissen & Crane
Attys

Inventor
AXEL R. SCHOLIN

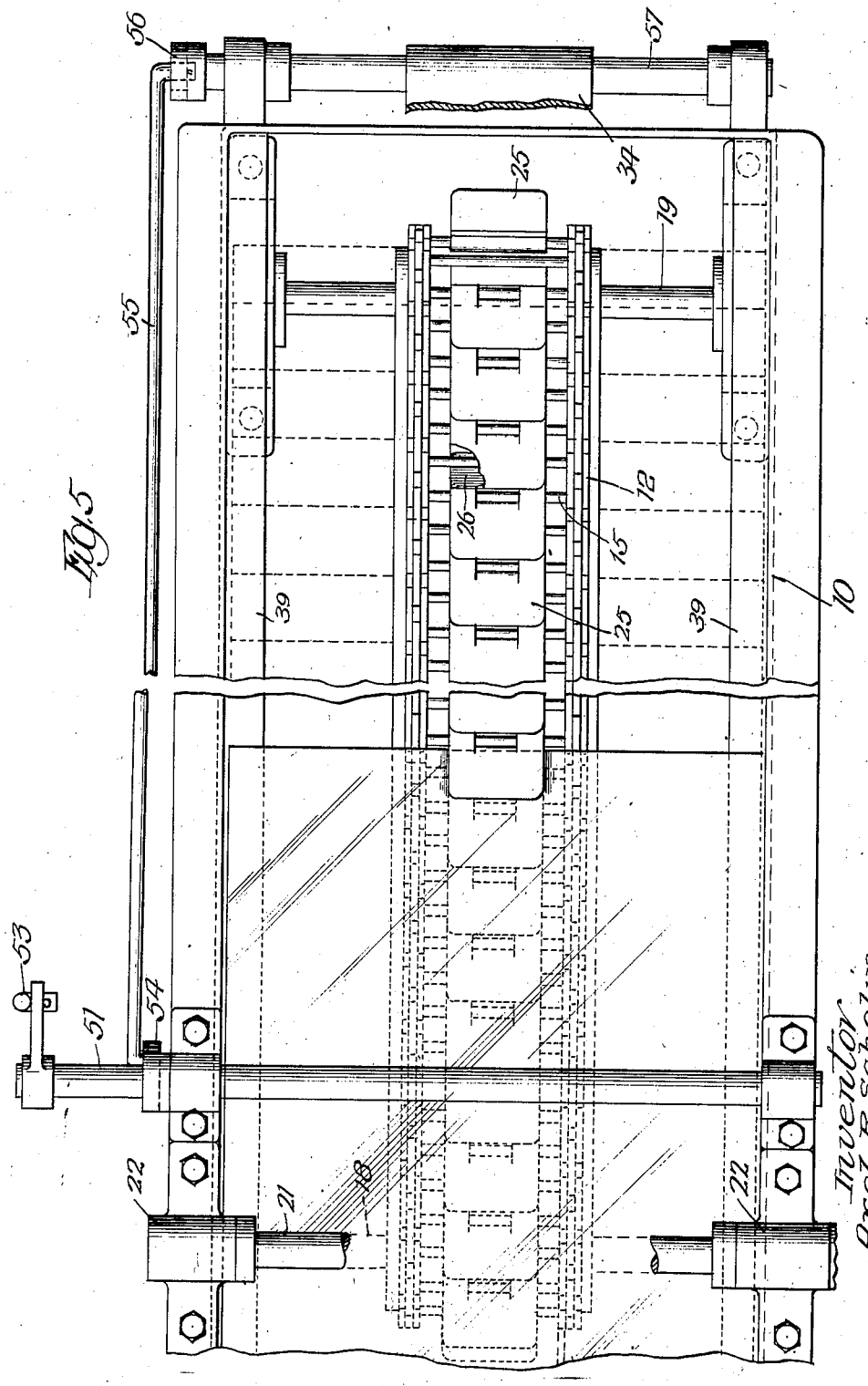

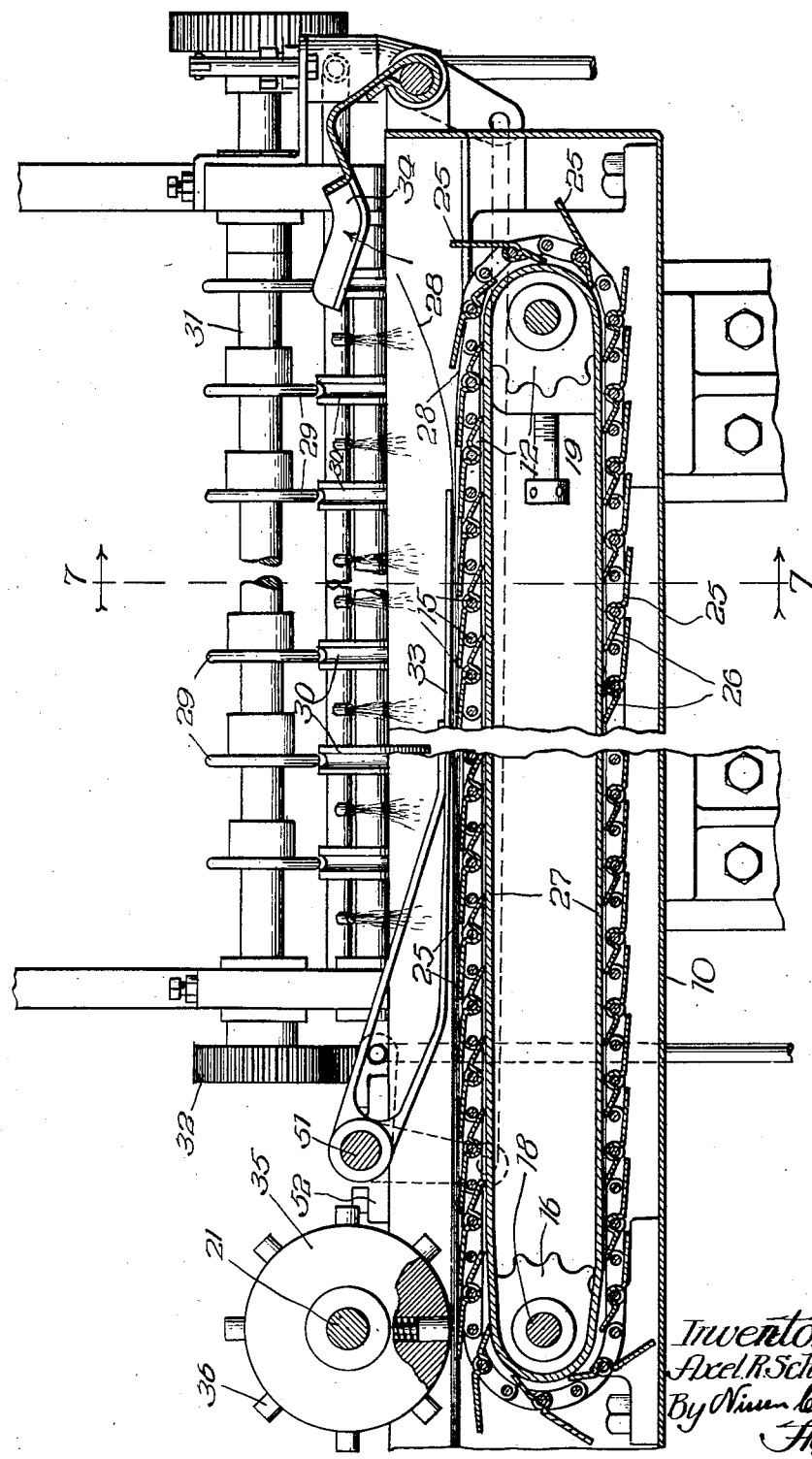

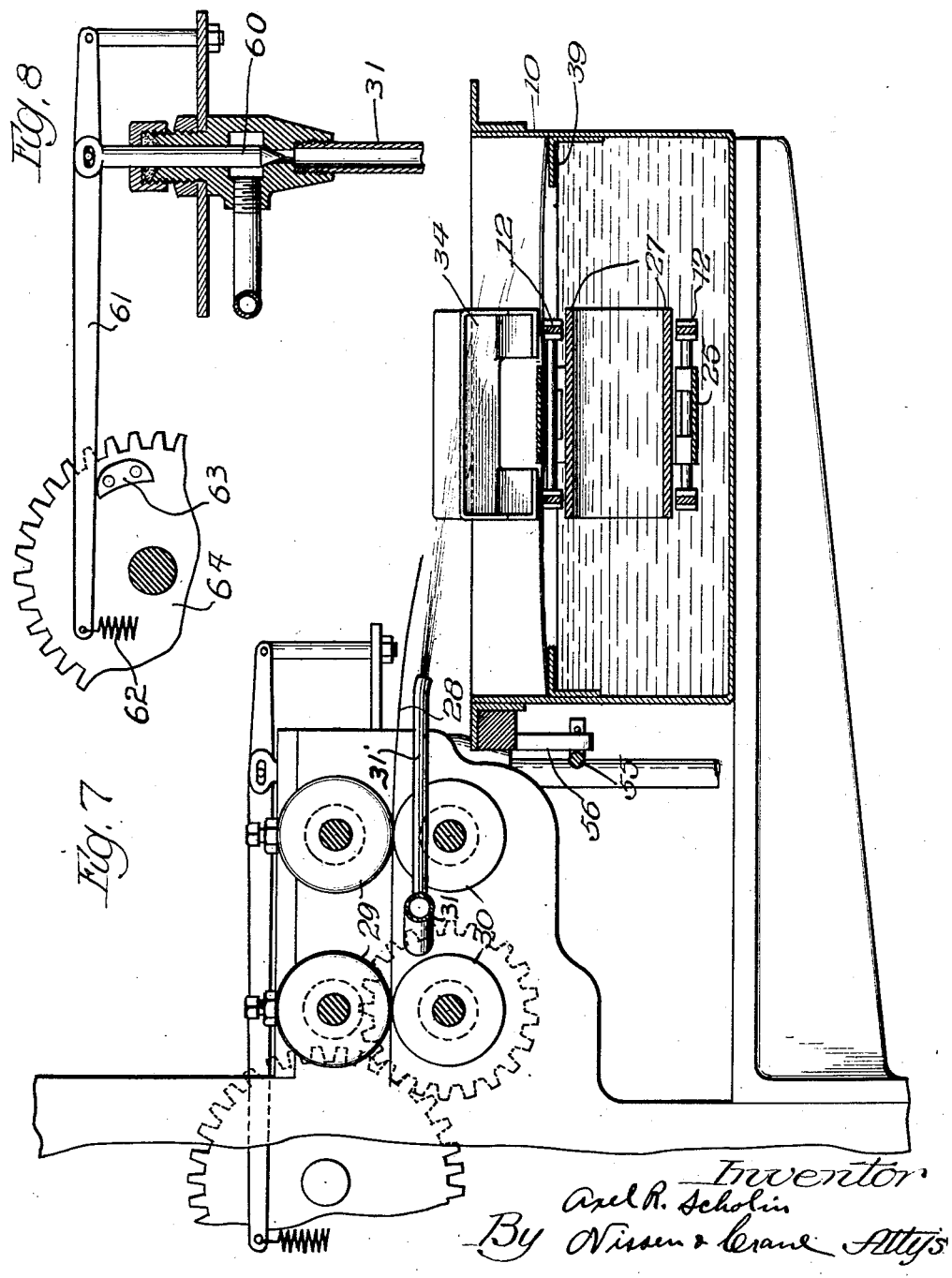

Patented Mar. 10, 1925.

1,529,090

UNITED STATES PATENT OFFICE.

AXEL R. SCHOLIN, OF CHICAGO, ILLINOIS, ASSIGNOR TO AUTOMATIC WRAPPING MACHINE CO., OF CHICAGO, ILLINOIS, A CORPORATION OF ILLINOIS.

TREATMENT OF LABELS.

Application filed October 28, 1921. Serial No. 511,118.

*To all whom it may concern:*

Be it known that I, AXEL R. SCHOLIN, a citizen of the United States, residing at Chicago, in the county of Cook and State of Illinois, have invented certain new and useful Improvements in the Treatment of Labels, of which the following is a specification.

This invention relates to the application of wrappers or labels to packages by a process and apparatus similar to that shown in my Patent No. 1,417,946, granted May 30, 1922, of which the present application contains divisional subject-matter.

The object of the invention is to provide an improved process and apparatus for the purpose designated.

The invention is exemplified in the combination and arrangement of parts shown in the accompanying drawings and described in the following specification, and it is more particularly pointed out in the appended claims.

In the drawings—

Fig. 5 is a top plan view of a portion of a labeling machine showing the tempering runway and conveyer;

Fig. 6 is a vertical section on line 6—6 of Fig. 1;

Fig. 7 is a vertical section on line 7—7 of Fig. 6; and

Fig. 8 is a fragmentary sectional view of a detail construction.

Figure 1:
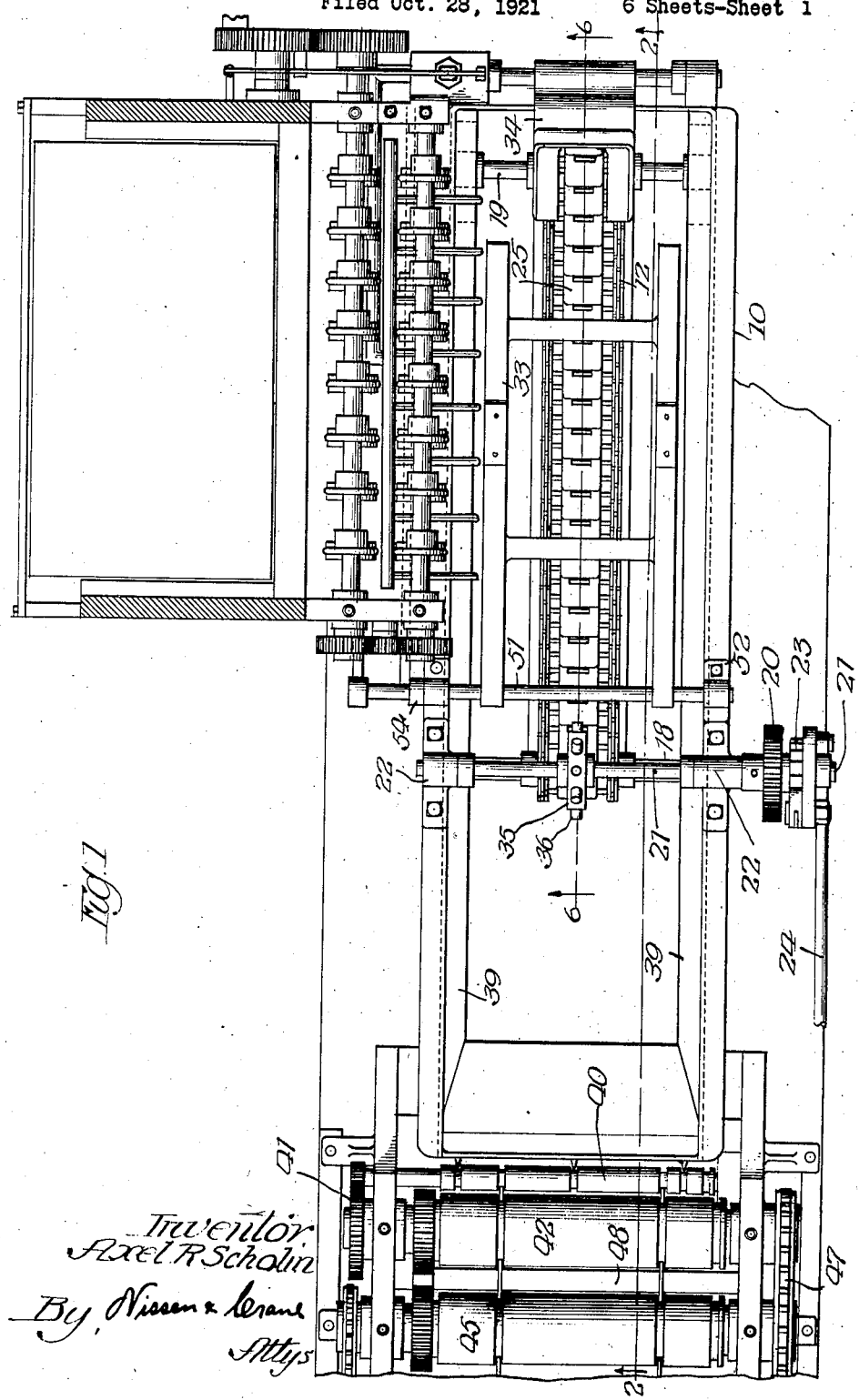
Fig. 1 is a top plan view of a portion of a labeling or wrapping machine embodying one form of the present invention.

In the application of wrappers or labels to packages, such as circular cans of paperboard or sheet metal, it is desirable that the wrapper shall be stretched tightly about the package so that the package will be airtight when sealed. To accomplish this the wrapper is preferably thoroughly soaked or tempered and stretched before it is placed upon the package, and after the soaking and stretching process it may be pasted and wrapped about the package while still moist. When the wrapper has thus been applied it will contract in drying, removing all wrinkles and giving a perfectly sealed cover for the package.

The present invention embodies mechanism and a process for soaking and stretching the wrappers preparatory to their application to packages and forms a part of a machine shown and claimed in my prior patent referred to above.

In the embodiment of the invention shown in the drawings, a tank 10 is supported upon a frame 11 and within the tank is disposed a conveyer 12 for conducting wrappers over the tank. The conveyer 12 comprises a pair of sprocket chains 13 connected by cross-rods 15 and passing over sprocket wheels 16 and 17 carried by shafts 18 and 19, respectively. The shaft 18 is connected by a pair of gears 20 with a shaft 21 journaled in bearings 22 carried on the frame of the machine above the tank 10. The shaft 22 is provided with pawl and ratchet mechanism 23 which is actuated by a reciprocating rod 24 to impart periodic rotation to the shafts 18 and 21. As shown in Figs. 5 and 6, the alternate cross-rods 15 of the conveyer 12 carry gripping plates 25 pivoted thereon. The gripping plates 25 are provided with tailpieces 26 which bear upon control plates 27 positioned within the confines of the conveyer chain. In the straight-away portions of the conveyer each gripping plate 25 is held against its preceding cross-bar 15 by its tailpiece 26. The guide plate 27 at the ends of the conveyer is spaced inwardly a greater amount than at the straight-away portions, permitting the gripping plates 25 to move outwardly away from the cross-bar 15, as shown at the opposite ends of the conveyer in Fig. 6.

The sheets 28 are fed to the tank by a set of rollers 29 and 30 to which the sheets may be presented, one at a time, by any suitable mechanism. The rollers 29 and 30 are provided with interfitting peripheries which form corrugations in the sheet, thus stiffening the sheet so that it will be projected in a substantially flat plane from the rollers to the tank. As the sheet is being fed to the tank it is subjected to a spray of hot water from a head 31 to which water is supplied. For some grades of paper, water at substantially boiling temperature is preferred, but lower temperatures may be used for other grades, especially for some soft papers. The water is directed against the lower face of the sheets by tubes 31' and the jets or streams assist in supporting the sheets as they move onto the runway. The rollers 29 and 30 are driven by gearing 32 which is operated in timed relation with the reciprocating rod 24. The parts are so timed that a sheet will be discharged onto the conveyer at each pause in the movement of the conveyer under the action of the pawl and ratchet mechanism 23. Each intermittent movement of the conveyer brings a new clamping plate 25 substantially into the position shown in Fig. 6. In this figure a sheet 28 is shown as it is being brought into place to be clamped by the gripping plate 25.

Figure 2:
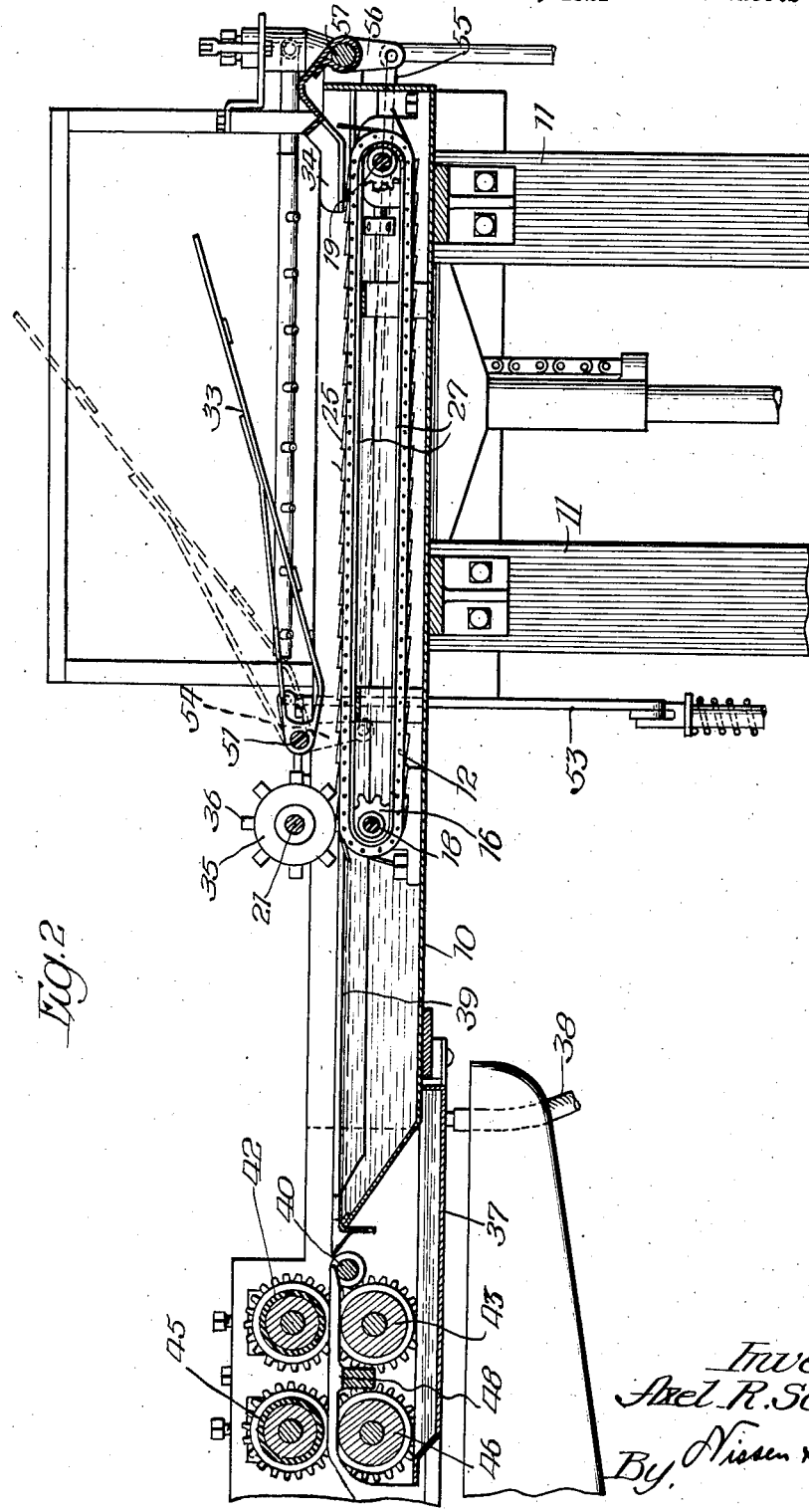
Fig. 2 is a vertical section substantially on line 2—2 of Fig. 1.
Figure 3:
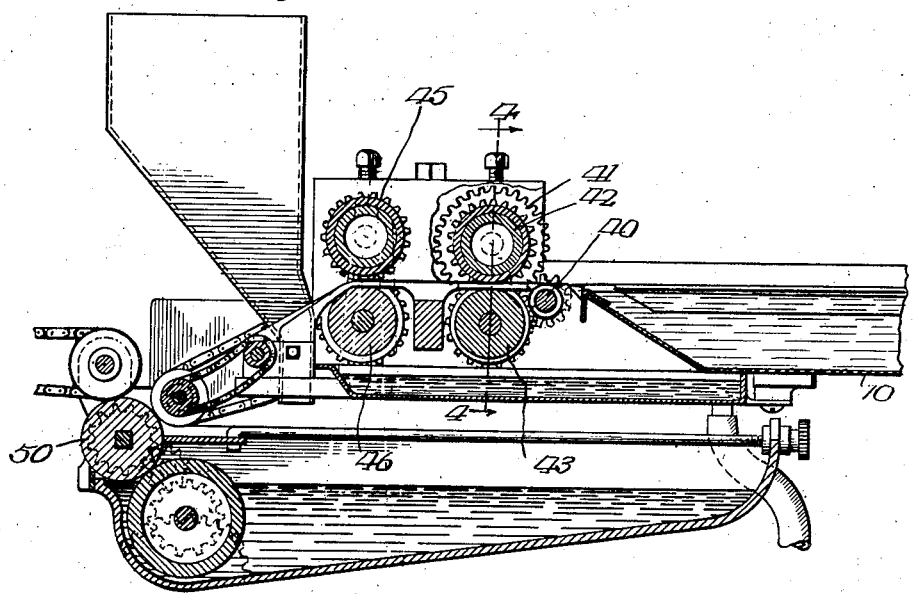
Fig. 3 is a vertical section showing the stretcher rollers and paste applying mechanism.
Figure 4:
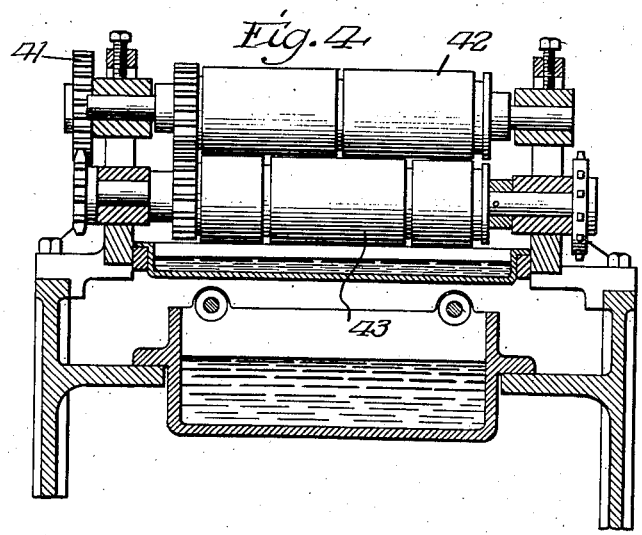
Fig. 4 is a vertical section on line 4—4 of Fig. 3.

To properly position the sheets on the conveyer a pair of strikers 33 and 34 are arranged to engage the sheet and move it into the position to be clamped by the gripping plate. At the time that the sheet is discharged from the rollers 29 and 30 the forward striker 33 is in its upper position shown in broken lines in Fig. 2 so that the sheet enters below the forward striker, but falls upon the top of the rear striker 34. The striker 33 then moves downwardly pressing the sheet against the top of the conveyer, as shown in Fig. 6, and the rear striker swings upwardly snapping past the rear edge of the sheet. The rear striker then returns to its lower position on the top of the sheet, as shown in Fig. 2, and the front striker is lifted to the full line position in that figure. The conveyer then moves forwardly and the gripping plate 25 passes upwardly between the bifurcated portions of the rear striker, as shown in Fig. 1, and engages the rear edge of the sheet. As the chain continues to move forwardly the gripping plate 25 is pressed downwardly by the guide plate 27 until it grips the rear portion of the sheet between the lower face of the guide plate and the bar 25 immediately ahead of the bar on which the guide plate is pivoted. It will be seen that in this way the conveyer is supplied with a series of sheets, each sheet lying chiefly on top of the preceding sheet, but having its rear edge overlapping for a short distance behind the rear edge of the sheet directly beneath it. It will be seen that by this arrangement the forward edge of each sheet will project for a short distance beyond the forward edge of the sheet immediately above. By this arrangement the slideway for the sheets above the tank is given a large capacity and each sheet is moved slowly along the slideway to give ample time for the water sprayed upon the sheets to thoroughly penetrate the same. The movement of the sheets along the slideway is augmented by a wheel 35 carried on the shaft 21 and provided with spring-pressed contact plugs 36 projecting from its periphery. Each movement of the ratchet wheel 23 brings a new plug into engagement with the upper face of a sheet on the conveyer and traveling with the conveyer assists in drawing the sheets forwardly. Any water that drains from the sheets is caught by the tank 10 from the forward end of which it flows into a basin 37 provided with a drain 38. The sheets are supported by the conveyer 12 and by flanges 39 projecting inwardly from the walls of the tank 10. Sufficient water for tempering the sheets is provided by the spray heads 31 and the tank 10 is merely a catch basin for disposing of the excess. The front or overflow end of the trough may be arranged at a height to bring the surface level of the water below the sheets, so that the sheets need not be dragged through the water, but are supported above the surface thereof.

The sheets are moved forwardly until the front edge of the lowermost sheet projects over the front edge of the tank and rests upon a roller 40 adjacent the front edge of the tank. The roller 40 is driven by a gear 41 so that its periphery travels at a speed somewhat greater than the rate of movement of the sheets in the tank. This will guide the forward edge of each sheet between feed rollers 42 and 43 by which each sheet is drawn rapidly from the tank after it has been released from beneath the pressure wheel 35. The sheets pass from the rollers 42 and 43 to rollers 45 and 46 which are connected to roller 43 by a sprocket chain 47, the rollers 45 and 46 having a slightly greater peripheral velocity than the rollers 42 and 43 so that the sheet in passing from one set of rollers to the other will be positively stretched while thoroughly soaked.

The sheets are prevented from adhering to the surface of the rollers by stripper bars 48 which lie in grooves formed in the rollers and which support the sheets as they are moved from one set of rollers to another. The roller 40 has been found to be of great assistance in keeping the sheets straight as they are fed from the slideway to the stretching rollers. After the sheet leaves the stretching rollers it is conducted by supporting chains 49 to a glue roll 50 from which it is fed to the mechanism by which it is placed upon the packages, such as that shown in my prior patent referred to above.

The striker 33 is secured to a rocker shaft 51 journaled in bearings 52 on the side of the tank and operated by a reciprocating rod 53 which may be actuated by any suitable mechanism connected in timed relation with other parts of the machine. The shaft 51 is provided with an arm 54 connected by a link 55 with an arm 56 on a shaft 57 which carries the striker 34. This insures the operation of the two strikers in proper timed relation with one another.

The supply of water to the head 31 may be controlled by a valve 60, Fig. 8. The valve 60 has an operating lever 61 attached thereto provided with a spring 62 which normally holds the valve closed. A cam lug 63 is secured to the gear 64 which drives the feed rollers 29 and 30. The parts are so arranged that jets of water will be discharged from the tubes 31' each time a sheet is discharged from the rollers 29 and 30. As the sheets leave the rollers they will settle upon the jets of water, the movement of which will assist in carrying the sheets to their proper position on the tempering runway.

I claim:—

1. In combination, means for holding a plurality of sheets in superimposed position with two opposite edges of each of said sheets in offset relation relative to corresponding edges of adjacent sheets, means for moving the pile of sheets thus formed, and means for individually engaging each sheet near one of the offset edges thereof and for imparting movement thereto relative to the other sheets in the pile for removing the sheets from said pile.

2. Means for preparing labels for label-applying mechanism, comprising means for arranging labels with their surfaces in contact with one another and with their front edges in offset relation, means for treating said labels while so arranged, means for moving said labels relative to said treating means, and means for indivdually engaging said labels adjacent the front edges thereof to extract said labels from the pile and to present said labels to said applying mechanism.

3. In a labeling machine, mechanism for arranging a plurality of labels with the front edges thereof in offset relation, means for treating said labels, means for moving said labels relative to said treating means, and means for extracting said labels, one at a time, from the side of the pile thereof toward which said labels are moved.

4. In a wrapping machine, means for moistening a wrapper, two pairs of rollers through which said wrapper is passed to remove excess of moisture therefrom and to stretch said wrapper, said rollers having grooves therein, and fingers extending from one pair of said rollers to another and arranged to lie in said grooves to guide said wrapper from one pair of rollers to the other.

5. In a wrapping machine, a tempering runway, means for moving wrappers forwardly on said runway, and means for periodically discharging wrappers onto said runway so that the wrappers on said runway will be arranged in offset relation to one another.

6. In a wrapping machine, a tempering runway, means for feeding wrappers forwardly on said runway, means for periodically discharging wrappers onto said runway so that the wrappers on said runway will be arranged in offset relation to one another, and means for periodically removing wrappers from said runway so that all the wrappers shall remain on said runway for substantially equal periods and so that there shall be a fixed number of wrappers on said runway at all times.

7. In a wrapping machine, a tempering runway, a conveyer arranged to travel along said runway, means for intermittently discharging wrappers onto said conveyer so that said wrappers shall engage said conveyer in offset overlapping relation to one another, and spaced clamps on said conveyer for engaging said wrappers to hold them in their offset relation to one another.

8. In a wrapping machine, a conveyer having a plurality of holding clamps pivotally connected thereto in spaced relation to one another, a guide extending along the path of movement of said conveyer for engaging said clamps for holding said clamps in position to engage the edges of wrappers on said conveyer, said guide being shaped to permit the opening of said clamps at a receiving and at a discharging position, and means for periodically feeding wrappers to said conveyer at the receiving position thereof and in position to be engaged by said clamps when moved into open position by said guide.

9. In a wrapping machine, a tempering runway, means for periodically discharging wrappers onto said runway, a conveyer arranged to receive the wrappers as they are discharged onto said runway, means for intermittently moving said conveyer so that the wrappers received thereby will be arranged in offset relation thereon, and an intermittently rotating wheel having resilient means for engaging the wrappers on said conveyer to assist said conveyer in moving said wrappers along said runway.

10. In a wrapping machine, a tempering runway, a conveyer for moving wrappers along said runway, and a rotary wheel having spring-pressed members thereon for engaging said wrappers to assist in the movement of wrappers along said runway.

11. In a wrapping machine, a spray head, a tank for catching excess water from said spray head and arranged to permit overflow at one edge thereof, means for feeding sheets of material over said edge, and projections on said edge to prevent said sheets from being bent downwardly by the water overflowing said edge.

12. In a wrapping machine, a spray head for moistening wrappers, means for feeding wrappers adjacent said spray head, said spray head being positioned to deliver a stream of water against the lower faces of said wrappers to partially support said moistened wrappers, and means for supplying water at a high temperature to said spray head.

13. In a wrapping machine, a tempering runway, means for feeding a pile of wrappers forwardly along said runway at a comparatively slow rate of speed, and means for periodically discharging wrappers onto said runway so that the wrappers thereon will be arranged in offset relation to one another and so that each wrapper may remain on said runway a considerable length of time while such wrappers are supplied therefrom in comparatively rapid succession said runway being arranged to subject the entire wrapper to a tempering medium while the wrapper is passing therethrough.

14. In a wrapping machine, a sprinkler for moistening a wrapper, means for feeding said wrapper beneath said sprinkler, and means for forming corrugations in said wrapper to stiffen said wrapper so that it will remain substantially flat when subjected to the pressure of the water from said sprinkler.

15. In a wrapping machine, a sprinkler for moistening a wrapper, and a pair of rollers for feeding said wrapper beneath said sprinkler, said rollers having interfitting grooves and ridges for forming corrugations in said wrapper to stiffen said wrapper.

16. In a wrapping machine, means for moistening wrappers to be used by said machine, a tempering runway for moistened wrappers, means for feeding wrappers onto said runway, a pressure frame for positioning the wrappers on said runway, and means for periodically raising said frame to permit a wrapper to be fed onto said runway.

17. The combination with tempering mechanism for sheets, of means for withdrawing sheets from said tempering mechanism, and a roller positioned between said tempering mechanism and said withdrawing means to direct the sheets from said tempering mechanism to said withdrawing means.

18. The combination with sheet-moistening means, of a runway and a conveyer for feeding sheets along said runway, a pair of rollers for receiving sheets from said runway, and a supplemental roller for supporting the forward ends of said sheets as they are presented to said pair of rollers.

19. In combination, a tempering runway for sheets, means for feeding sheets along said runway, a pair of rollers for withdrawing the sheets from said runway, and a supplemental roller for moving the sheets from said runway to said pair of rollers, said supplemental roller being arranged to rotate at a peripheral speed greater than the movement of the sheets along said runway.

20. In combination, a sheet tempering runway, a conveyer for feeding sheets along said runway, means for gripping the sheets to assist said conveyer, a pair of rollers for withdrawing sheets from said runway, and a supplemental roller positioned adjacent said withdrawing rollers and rotated at a peripheral speed greater than the speed of the sheets along said runway, said supplemental roller being arranged to present said sheets to said withdrawing rollers subsequent to their release from said gripping means.

21. Sheet-soaking mechanism comprising a conveyer, means for feeding sheets, one at a time, to said conveyer, and a pair of strikers operating at different times to engage said sheets and press them upon said conveyer.

22. Sheet-tempering mechanism comprising a runway having a conveyer therein, means for gripping the rear edges of sheets to hold them on said conveyer, and means for holding sheets upon said conveyer while they are being engaged by said gripping means.

23. Sheet-tempering mechanism comprising a runway having a conveyer arranged therein, a plurality of grippers carried by said conveyer, means for periodically feeding sheets to said runway, means for moving said conveyer in timed relation with said feeding means to cause said sheets to be arranged in overlapping relation to one another on said conveyer, and means for holding said sheets on said conveyer while they are being engaged by said gripper.

24. Sheet-tempering mechanism comprising a runway having a conveyer therein, a plurality of grippers carried by said conveyer, means for moving said grippers into engagement with said sheets as said grippers move about one end of said conveyer, and a bifurcated contact member arranged to press upon the sheets at said end of said conveyer and to permit said grippers to move between the bifurcations thereof into engagement with said sheets.

25. Sheet-tempering mechanism comprising a runway having a conveyer therein, a plurality of grippers carried by said conveyer, means for periodically feeding sheets to said runway, a pair of strikers operating at different times to press said sheets upon said conveyer, means for actuating said grippers to cause each gripper to engage a sheet at a predetermined position in the movement of said gripper, and means for moving said conveyer in timed relation with said sheet-feeding means, one of said strikers being arranged to hold the sheets in position on said conveyer while they are being engaged by said grippers.

26. In a wrapping machine, feeding mechanism for discharging sheets in substantially horizontal position, and means for directing a stream of liquid against the lower faces of said sheets as they are discharged.

27. In sheet treating mechanism, means for discharging sheets in substantially horizontal position, means for directing streams of liquid against the lower faces of said sheets to assist in supporting said sheets while being discharged, and means for receiving the sheets to permit tempering thereof by the liquid discharged thereagainst.

28. In a wrapping machine, a tempering runway, means for discharging sheets, one at a time, onto said runway, and means for directing sprays of water against the lower surfaces of said sheets as they are being discharged to assist in supporting the sheets in their movement onto said runway and to supply moisture for tempering the sheets.

29. The process of tempering sheets of absorbent material wherein substantially the entire surface of said sheets is treated with a tempering medium, the sheets being arranged in offset overlapping relation during a tempering period.

30. The process of treating labels wherein the labels are treated with a tempering medium and arranged in offset overlapping relation during a tempering period, the portions of said labels covered by other labels being subject to said tempering medium during said period.

31. The process of treating labels wherein said labels are moved along a tempering runway while arranged in offset overlapping relation, the portions of said labels covered by other labels being subjected to a tempering medium during the movement thereof in said runway.

32. The process of treating labels comprising the steps of moistening substantially the entire portion of each label, arranging said labels in offset overlapping relation and moving said labels while so arranged along a tempering runway to permit said labels to become tempered by the moisture to which they are subjected.

33. The process of tempering labels wherein each label is separately subjected to water at a high temperature, the moistened labels being arranged in offset overlapping relation with the moistened portions thereof overlapping one another, said labels being moved along a tempering runway while so arranged to permit absorption of said moisture and consequent tempering of said labels.

34. The method of treating labels comprising the steps of moistening said labels, arranging said labels so that moistened surfaces thereof will engage one another, the labels being offset to permit exposure of a portion of each of said labels during the tempering period.

35. Means for tempering sheets comprising a runway, a conveyer having clamps thereon, means for feeding sheets to said conveyer in offset overlapping relation to one another, means for moistening said sheets so that the moistened portions thereof will overlap one another when said sheets are on said conveyer, and means for moving said conveyer to transfer said sheets along said runway.

36. Means for tempering labels comprising a runway, means for depositing sheets in said runway in offset overlapping relation to one another, means for subjecting portions of said sheets covered by other sheets to a tempering medium, and means for moving said sheets along said runway while arranged in overlapping relation.

In testimony whereof I have signed my name to this specification on this 18th day of October, A. D. 1921.

AXEL R. SCHOLIN.